United States Patent
Gao et al.

(10) Patent No.: US 11,221,834 B2
(45) Date of Patent: Jan. 11, 2022

(54) METHOD AND SYSTEM OF INTELLIGENT ITERATIVE COMPILER OPTIMIZATIONS BASED ON STATIC AND DYNAMIC FEEDBACK

(71) Applicant: Huawei Technologies Co., Ltd., Shenzhen (CN)

(72) Inventors: Yaoqing Gao, Toronto (CA); Xuan Zhong, Shanghai (CN); Peng Wu, Pittsford, NY (US); Long Chen, Cupertino, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/827,123

(22) Filed: Mar. 23, 2020

(65) Prior Publication Data
US 2020/0293295 A1   Sep. 17, 2020

Related U.S. Application Data

(63) Continuation of application No. PCT/CN2018/091928, filed on Jun. 20, 2018.

(51) Int. Cl.
*G06F 8/41* (2018.01)
*G06N 20/00* (2019.01)
(Continued)

(52) U.S. Cl.
CPC .......... *G06F 8/443* (2013.01); *G06F 11/3065* (2013.01); *G06F 11/3457* (2013.01); *G06F 11/3466* (2013.01); *G06N 20/00* (2019.01)

(58) Field of Classification Search
CPC .. G06F 8/443; G06F 11/3065; G06F 11/3457; G06F 11/3466; G06N 20/00
See application file for complete search history.

(56) References Cited

U.S. PATENT DOCUMENTS

| 5,966,537 A * | 10/1999 | Ravichandran ......... G06F 8/443 717/158 |
| 2003/0023961 A1 * | 1/2003 | Barsness ................. G06F 8/443 717/152 |

(Continued)

FOREIGN PATENT DOCUMENTS

| CN | 101551748 A | 10/2009 |
| CN | 101604287 A | 12/2009 |

(Continued)

OTHER PUBLICATIONS

Grigori Furisin et al., "MILEPOST GCC: machine learning based research compiler," 2008 [retrieved on Aug. 1, 2020], GCC Summit, Jun. 2008, Ottawa, Canada, ffinria-00294704, downloaded from Internet at <url>:https://hal.inria.fr/inria-00294704/document. (Year: 2008).*

(Continued)

*Primary Examiner* — S. Sough
*Assistant Examiner* — Stephen D Berman
(74) *Attorney, Agent, or Firm* — Slater Matsil, LLP

(57) ABSTRACT

Systems and methods for auto-tuning and compiling source code are provided. A first executable file is generated by compiling the source code in accordance with a first optimization scheme. Compiling reports, performance reports, and bottleneck information are generated for the first executable file. A second optimization scheme is generated, and a second executable file is generated by compiling the source code in accordance with the second optimization scheme. An optimized executable file is output based on the first executable file and the second executable file.

34 Claims, 9 Drawing Sheets

(51) Int. Cl.
  *G06F 11/30* (2006.01)
  *G06F 11/34* (2006.01)

(56) References Cited

U.S. PATENT DOCUMENTS

| | | | |
|---|---|---|---|
| 2006/0236310 A1* | 10/2006 | Domeika | G06F 8/443 717/140 |
| 2009/0193402 A1* | 7/2009 | Bashkansky | G06F 8/443 717/145 |
| 2010/0122242 A1* | 5/2010 | Jiva | G06F 8/443 717/148 |
| 2010/0180255 A1* | 7/2010 | Chung | G06F 8/443 717/110 |
| 2013/0139137 A1 | 5/2013 | Zhao | |
| 2013/0185705 A1 | 7/2013 | Kuesel et al. | |
| 2014/0047423 A1* | 2/2014 | Pizlo | G06F 11/3452 717/153 |
| 2014/0289707 A1 | 9/2014 | Guan et al. | |
| 2017/0147476 A1 | 5/2017 | Ji | |
| 2019/0303117 A1* | 10/2019 | Kocberber | G06F 8/41 |

FOREIGN PATENT DOCUMENTS

| | | |
|---|---|---|
| CN | 103218245 A | 7/2013 |
| CN | 103858099 A | 6/2014 |
| CN | 103930868 A | 7/2014 |
| CN | 107003884 A | 8/2017 |
| CN | 107111505 A | 8/2017 |
| WO | 2013097253 A1 | 7/2013 |
| WO | 2013119441 A1 | 8/2013 |
| WO | 2016116132 A1 | 7/2016 |

OTHER PUBLICATIONS

Amir Hossein Ashouri et al., "COBAYN: Compiler Autotuning Framework Using Bayesian Networks," 2016 [retrieved on Aug. 1, 2020], ACM Transactions on Architecture and Code Optimization, Article No. 21, pp. 1-25, downloaded from Internet at <url>:https://dl.acm.org. (Year: 2016).*

F. Agakov et al., "Using Machine Learning to Focus Iterative Optimization," 2006 [retrieved on Aug. 1, 2020], International Symposium on Code Generation and Optimization (CGO'06), pp. 1-11, downloaded from Internet at <url>:https://ieeexplore.ieee.org/. (Year: 2006).*

T. Kisuki et al., "Iterative compilation in program optimization," 2000 [retrieved on Feb. 13, 2021], In Proc. CPC2000, pp. 35-44, downloaded from <url>https://citeseerx.ist.psu.edu/viewdoc/download?doi=10.1.1.36.3007&rep=rep1&type=pdf. (Year: 2000).*

P.M.W. Knijnenburg et al., "Iterative Compilation," 2002 [retrieved on Feb. 13, 2021], SAMOS 2001, LNCS 2268, pp. 171-187, downloaded from <url>:https://link.springer.com/chapter/10.1007/3-540-45874-3_10#citeas (Year: 2002).*

Zheng Wang et al., "Machine Learning in Compiler Optimization," May 10, 2018 [retrieved on Jul. 2, 2021], Proceedings of the IEEE, vol. 106, Issue 11, downloaded from <url>:https://ieeexplore.ieee.org. (Year: 2018).*

William Ogilvie et al., "Minimizing the cost of iterative compilation with active learning," 2017 [retrieved on Jul. 2, 2021], 2017 IEEE/ACM International Symposium on Code Generation and Optimization (CGO), downloaded from <url>:https://ieeexplore.ieee.org. (Year: 2017).*

Zou, Y., et al., "Shape-oblivious Parallel Compiler Optimization for Matrix Computations", Journal of Chinese Computer Systems, vol. 35 No. 7, Jul. 7, 2014, 5 Pages.

* cited by examiner

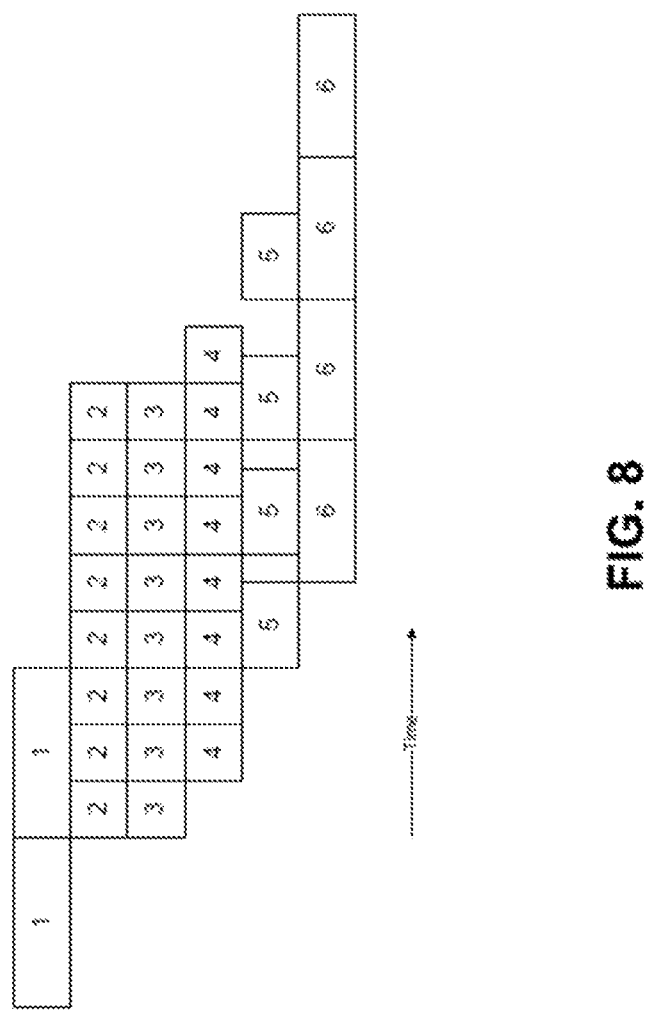

METHOD AND SYSTEM OF INTELLIGENT ITERATIVE COMPILER OPTIMIZATIONS BASED ON STATIC AND DYNAMIC FEEDBACK

CROSS-REFERENCE TO RELATED APPLICATIONS

This application is a continuation of PCT/CN2018/091928 filed Jun. 20, 2018, which application is hereby incorporated herein by reference.

TECHNICAL FIELD

This application relates to compilers, and in particular to automated optimizing compilers.

BACKGROUND

A compiler transforms source code of a software program written typically in a high level programming language, such as C, C++, Java™, etc., into object code (e.g. a sequence of instructions in a machine code language or a register transfer language (RTL)). Object code can be linked to one or more libraries to generate an executable file that can be read and executed by a processor having a particular architecture (e.g. by a processor of a computing device) to perform operations programmed in the source code. Different executable files can be produced by the compiler for distinct processors. The compiling process (e.g. the transformation of source code of a software program to object code (and ultimately to an executable file)) can be optimized so that the resulting executable file executes on a particular processor with a desired level of performance or efficiency during run-time.

Optimization of source code of software programs during compiling is a complex, challenging endeavor and typically requires intensive manual analysis of the source and/or object code by human experts. Achieving a desired level of performance can be difficult. This is because human experts are required to spend a significant amount of time and effort performing manual analysis of the source code and/or object code in order to determine a preferred optimization scheme for the compiler to transform the source code to object code (and ultimately an executable file that is executable on the particular processor). Moreover, selection of an optimization scheme by a human expert may not result in the optimal optimization scheme, as the selection is dependent upon subjective judgment and bias among human experts. This problem has been exacerbated as an increasing number of different types of processors available for execution of executable files, such as central processing units (CPUs), graphics processing units (GPUs), digital signal processors (DSPs), machine learning integrated circuits (ICs), field programmable gate arrays (FPGAs), and the like, having proprietary architectures, with which even experts may lack familiarity, which makes the manual analysis of source code and/or object code by human experts increasingly difficult to ensure a desired level performance of an executable file generated by the compiler.

SUMMARY

In accordance with one aspect, there is provided a method of auto-tuning and compiling source code, the method comprising: receiving, at a computing device, a source code; generating a first executable file by compiling the source code in accordance with a first optimization scheme; generating, at a computing device, a compiling report including data relating to the first optimization scheme; generating, at a computing device, a performance report including dynamic data relating to execution performance of the first executable file; receiving, at a computing device, performance bottleneck information indicative of one or more performance bottlenecks associated with the execution performance of the first executable file; generating, at a computing device, a second optimization scheme based on at least the compiling report, the performance report, and the performance bottleneck information; generating, at a computing device, a second executable file by compiling the source code in accordance with the second optimization scheme; and outputting, by a computing device, an optimized executable file based on the first executable file and the second executable file.

In any of the preceding embodiments, the method further comprises: prior to generating the first executable file, identifying one or more performance parameters associated with the source code.

In any of the preceding embodiments, a value of at least one performance parameter in the second optimization scheme is different from a value of the at least one performance parameter in the first optimization scheme.

In any of the preceding embodiments, generating the second optimization scheme comprises determining, by a machine learning module, the second optimization scheme based on at least one of the compiling report and the performance report.

In any of the preceding embodiments, outputting the optimized executable file comprises determining whether dynamic data relating to the execution performance of the second executable file is superior to the dynamic data relating to the execution performance of the first executable file with respect to a performance metric.

In any of the preceding embodiments, the compiling report includes at least one of: an identification of one or more transformations performed on the source code by the compiler; and for each of the one or more transformations performed by the compiler, a corresponding location in the source code in which the respective transformation was performed.

In any of the preceding embodiments, the dynamic data relating to execution performance of the first executable file comprises one or more of dynamic data relating to simulated execution performance of the first executable file on a particular processor simulator and dynamic data relating to execution performance of the first executable file on the particular processor.

In any of the preceding embodiments, the dynamic data includes one or more of trace information comprising one or more of machine cycles, stalls, cache misses, branch prediction misses, memory trace data, register counts, pipeline stalls, memory access counts, performance counters, cycle accuracy data, and memory register information.

In any of the preceding embodiments, the method further comprises transmitting, to a data store, one or more of the source code, the compiling report, the first executable file, the second executable file, and the dynamic data.

In any of the preceding embodiments, the method further comprises determining the second optimization scheme by: generating, using a machine learning unit, the mapping function for outputting an optimization recommendation based on the dynamic data associated with at least one previously executed executable file, compiling reports from the previously executed executable files, the performance report of the first executable file, and the compiling report of the first executable file.

In any of the preceding embodiments, selecting the second optimization scheme comprises: generating a search space containing a plurality of optimization schemes; and determining the second optimization scheme based on executing a search strategy on the search space.

In accordance with another aspect, there is provided a computing system comprising: at least one processor; a memory having stored thereon computer-executable instructions that, when executed by the at least one processor, cause the at least one processor to perform a method of auto-tuning and compiling source code, the method comprising: responsive to receiving a source code, generate a first executable file by compiling the source code in accordance with a first optimization scheme; generate a compiling report including data relating to the first optimization scheme; generate a performance report including dynamic data relating to execution performance of the first executable file; receive performance bottleneck information indicative of one or more performance bottlenecks associated with the execution performance of the first executable file; generate a second optimization scheme based on at least the compiling report, the performance report, and the performance bottleneck information; generate a second executable file by compiling the source code in accordance with a second optimization scheme; and output an optimized executable file based on the first executable file and the second executable file.

In any of the preceding embodiments, the method further comprises: prior to generating the first executable file, identifying one or more performance parameters associated with the source code.

In any of the preceding embodiments, a value of at least one performance parameter in the second optimization scheme is different from a value of the at least one performance parameter in the first optimization scheme.

In any of the preceding embodiments, generating the second optimization scheme comprises determining, by a mapping function, the second optimization scheme based on at least one of the compiling report and the performance report.

In any of the preceding embodiments, outputting the optimized executable file comprises determining whether dynamic data relating to the execution performance of the second executable file is superior to the dynamic data relating to the execution performance of the first executable file with respect to a performance metric.

In any of the preceding embodiments, the compiling report includes at least one of: an identification of one or more transformations performed on the source code by the compiler; and for each of the one or more transformations performed by the compiler, a corresponding location in the source code in which the respective transformation was performed.

In any of the preceding embodiments, the dynamic data relating to the execution performance of the first executable file comprises one or more of dynamic data relating to simulated execution performance of the first executable file on a particular processor simulator and dynamic data relating to execution performance of the first executable file on the particular processor.

In any of the preceding embodiments, the dynamic data includes one or more of trace information comprising one or more of machine cycles, stalls, cache misses, branch prediction misses, memory trace data, register counts, pipeline stalls, memory access counts, performance counters, cycle accuracy data, and memory register information.

In any of the preceding embodiments, the method further comprises: transmitting, to a data store, one or more of the source code, the compiling report, the first executable file, the second executable file, and the dynamic data.

In any of the preceding embodiments, the method further comprises: generating, using a machine learning unit, the mapping function for outputting an optimization recommendation based on the dynamic data associated with at least one previously executed executable file, compiling reports from the previously executed executable files, the performance report of the first executable file, and the compiling report of the first executable file.

In any of the preceding embodiments, selecting the second optimization scheme comprises generating a search space containing a plurality of optimization schemes; and the method further comprises determining the second optimization scheme based on executing a search strategy on the search space.

In accordance with another aspect, there is provided a non-transitory computer-readable storage medium storing computer-executable instructions thereon, which when executed by at least one processor, cause the at least one processor to perform a method of auto-tuning and compiling source code, the method comprising: responsive to receiving a source code, generate a first executable file by compiling the source code in accordance with a first optimization scheme; generate a compiling report including data relating to the first optimization scheme; generate a performance report including dynamic data relating to execution performance of the first executable file; receive performance bottleneck information indicative of one or more performance bottlenecks associated with the execution performance of the first executable file; generate a second optimization scheme based on at least the compiling report, the performance report, and the performance bottleneck information; generate a second executable file by compiling the source code in accordance with a second optimization scheme; and output an optimized executable file based on the first executable file and the second executable file.

In any of the preceding embodiments, the method further comprises: prior to generating the first executable file, identifying one or more performance parameters associated with the source code.

In any of the preceding embodiments, a value of at least one performance parameter in the second optimization scheme is different from a value of the at least one performance parameter in the first optimization scheme.

In any of the preceding embodiments, generating the second optimization scheme comprises determining, by a mapping function, the second optimization scheme based on at least one of the compiling report and the performance report.

In any of the preceding embodiments, outputting the optimized executable file comprises determining whether dynamic data relating to the execution performance of the second executable file is superior to the dynamic data relating to the execution performance of the first executable file with respect to a performance metric.

In any of the preceding embodiments, the compiling report includes at least one of: an identification of one or more transformations performed on the source code by the compiler; and for each of the one or more transformations performed by the compiler, a corresponding location in the source code in which the respective transformation was performed.

In any of the preceding embodiments, the dynamic data relating to the execution performance of the first executable file comprises one or more of dynamic data relating to simulated execution performance of the first executable file on a particular processor simulator and dynamic data relating to execution performance of the first executable file on the particular processor.

In any of the preceding embodiments, the dynamic data includes one or more of trace information comprising one or more of machine cycles, stalls, cache misses, branch prediction misses, memory trace data, register counts, pipeline stalls, memory access counts, performance counters, cycle accuracy data, and memory register information.

In any of the preceding embodiments, the method further comprises: transmitting, to a data store, one or more of the source code, the compiling report, the first executable file, the second executable file, and the dynamic data.

In any of the preceding embodiments, the method further comprises: generating, using a machine learning unit, the mapping function for outputting an optimization recommendation based on the dynamic data associated with at least one previously executed executable file, compiling reports from the previously executed executable files, the performance report of the first executable file, and the compiling report of the first executable file.

In any of the preceding embodiments, selecting the second optimization scheme comprises generating a search space containing a plurality of optimization schemes; and the method further comprises determining the second optimization scheme based on executing a search strategy on the search space.

In accordance with another aspect, there is provided a method of compiling source code of an auto-tuning enabled software program. The method includes receiving, at a compiler system, the source code of the auto-tuning enabled software program, receiving, at the compiler system, a recommended optimization scheme selected from a plurality of optimization schemes by a machine learning module based on optimization parameters stored in a knowledge database, the optimization scheme comprising one or more optimizations to be performed on the source code of the auto-tuning enabled software program, and compiling, at a compiler system, the source code in accordance with the one or more optimizations of the optimization scheme to generate the executable file for execution on a processor having a particular architecture.

In accordance with another aspect, there is provided a compiling system comprising a complier configured to: receive source code of the auto-tuning enabled software program; receive a recommended optimization scheme selected from a plurality of optimization schemes by a machine learning module based on optimization parameters stored in a knowledge database, the optimization scheme comprising one or more optimizations to be performed on the source code of the auto-tuning enabled software program; and compile the source code in accordance with the one or more optimizations of the optimization scheme to generate the executable file for execution on a processor having a particular architecture.

Further features and combinations thereof are disclosed herein and will be apparent to those skilled in the art following a reading of the instant disclosure.

BRIEF DESCRIPTION OF THE DRAWINGS

In the figures, which depict example embodiments:

FIG. 8 illustrates an example of optimizing a convolutional neural network (CNN) operating on a multi-core processor that includes an AI core which includes multiple pipelines that communicate through shared memories and require explicit synchronization.

Figure 1:
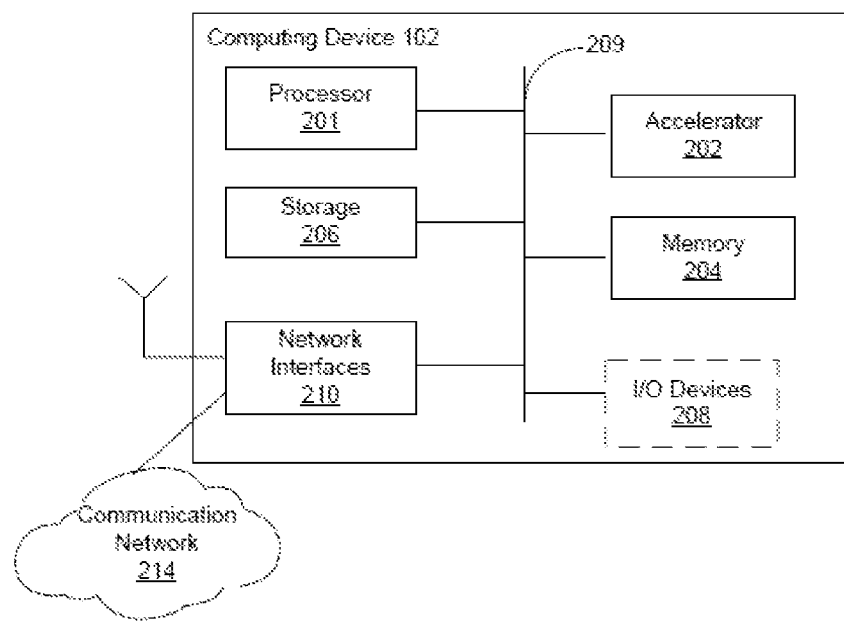
FIG. 1 is a block diagram depicting components of an example computing device.

These drawings depict aspects of example embodiments for illustrative purposes. Variations, alternative configurations, alternative components and modifications may be made to these example embodiments.

DETAILED DESCRIPTION OF ILLUSTRATIVE EMBODIMENTS

Optimization of source code of a software program during compiling by a compiler is conducted with a specific processor in mind (e.g. a processor or chipset having a certain type of architecture and running a certain type of operating system), and so knowledge of the architecture of the processor on which the resulting executable file generated by the compiler) will be executing may be necessary in order to conduct such optimization efficiently.

It is desirable to automate the process of optimization during compiling such that optimization is performed in an intelligent manner, without the need for human intervention, or at least with less human intervention than previously required. By leveraging machine learning technologies, some embodiments disclosed herein may provide systems and methods for optimizing source code of software programs during compiling such that execution of the resulting executable file on a processor having a particular architecture achieves greater performance or efficiency than existing systems and approaches.

Throughout this disclosure, the term "optimization" may refer to transformations performed on the source code (or source code that was previously transformed) by a compiler during compiling. Examples of transformations performed on source code by a compiler during compiling include, but are not limited to, strength reduction, in-lining small functions, code hoisting, dead store elimination, common sub-expressions elimination, loop unrolling, code motion, induction variable elimination, local constant folding or elimination, register allocation, instruction scheduling, memory hierarchy optimization, and the. Performance parameters are parameters associated with a transformation. Performance parameters may include, for example, tiling size, unroll factors, invariant code motions, inline thresholds, or the like. For example, loop unrolling is associated with an unrolling factor. Performance parameters can be adjusted (or "tuned") to affect the optimization of the source code during compiling. In some embodiments, optimization of source code refers to the process of performing transformations on source code so as to ultimately generate an executable file that, when executed on a particular processor architecture, achieves improved execution performance with respect to at least one performance metric (e.g. below a target power consumption, faster than a target execution speed, with fewer than a predetermined number of cache misses, register spills or other execution-related issues).

The term "optimization scheme" may include a collection of one or more optimizations applied at various levels of granularity (e.g. hardware-independent techniques and hardware-specific techniques) during compiling. In some embodiments, an optimization scheme may improve the performance of the execution of the executable file generated by the compiler on the particular processor architecture at runtime.

Embodiments disclosed herein relate to compiler systems and methods that can automatically generate multiple executable files based on the same underlying source code of a software program. Each executable file is executable on the same processor (e.g., the process having the same architecture). Different optimizations may be applied by the compiler to the source code of the software program to generate different executable files. As such, each executable file may be different from every other executable file. In some embodiments, the executable files are generated iteratively, such that a first executable file is generated prior to the second executable file being generated. In some embodiments, static information and dynamic information associated with a first executable file generated by the compiler during compiling can be used to identify and determine potential modifications to performance parameters or further transformations which can be applied by the compiler when performing a second iteration of compiling the source code of the software program to generate a second executable file.

In some embodiments, the compiler software system is configured to determine an optimization scheme for the source code of the software program using machine learning techniques, based on various types of information obtained from one or more previous compiling iterations of the same or similar source code. For example, a compiler of the compiler software system can generate a compiling report each time the compiler compiles the source code of the software program into object code and generates an executable file. The compiling report can include compilation data relating to optimizations applied by the compiler during compilation of the source code of the software program.

As a further example, a simulator of the compiler software system can simulate execution of an executable file generated by the compiler on a particular processor and generate data indicative of dynamic runtime information based on the simulated execution. Both the compiling report and the dynamic runtime information can be analyzed by a machine learning module of the compiler software system to identify "hot spots" and performance bottlenecks during the simulated execution of the execution file. In some embodiments, the machine learning module is configured to automatically generate an optimization scheme (e.g. a list of transformations and performance parameter values) for the source code of the software program based on one or more of the compilation data included in the compiling report, data indicative of the dynamic runtime information, and data indicative of the identified bottlenecks obtained from previous compiling and simulation iterations of executable files based on the same source code.

In some embodiments, the automatically generated optimization scheme is subsequently implemented by the compiler when compiling the source code of the software program in order to generate a second executable file. The second executable file, when executed by a simulator or a processor may run with improved performance or efficiency (e.g. improved time of execution, fewer memory access issues, or the like) compared to the execution of the first executable file generated in the previous iteration of compiling of the source code of the software program. The iterative process of compiling of the source code of the software program, executing an executable file generated by the compiling the source code of the software program to generate an optimization scheme, and subsequently compiling the source code based on the generated optimization scheme to generate another executable file may continue until a specific performance target for execution of the resulting executable file on a particular processor has been reached. For example, the iterative process may continue until it has been determined that the resulting executable file, when simulated or executed, achieves a performance target (e.g. requires less than a threshold amount of time and/or less than a threshold amount of memory storage for execution, incurs less than a threshold amount of memory access issues, or the like).

FIG. 1 is a block diagram depicting components of an example computing device 102. Computing device 102 may be any suitable computing device, such as a server, a desktop computer, a laptop computer, a tablet, a smartphone, and the like. Computing device 102 includes one or more processors 201 that control the overall operation of computing device 102. The processor 201 interacts with several components, including memory 204 via a memory bus 203, and interacts with accelerator 202, storage 206, and network interface 210 via a bus 209. Optionally, the processor 102 interacts with I/O devices 208 via bus 209. Bus 209 may be one or more of any type of several buses, including a peripheral bus, a video bus, and the like.

Each processor 201 may be any suitable type of processor, such as a central processing unit (CPU) implementing for example an ARM or x86 instruction set, and may further include specialized processors such as a Graphics Processing Unit (GPU), Neural processing unit (NPU), AI cores, or any other suitable processing unit. Accelerator 202 may be, for example, an accelerated processing unit (e.g. a processor and graphics processing unit combined onto a single die or chip). Memory 204 includes any suitable type of system memory that is readable by processor 201, such as static random access memory (SRAM), dynamic random access memory (DRAM), synchronous DRAM (SDRAM), read-only memory (ROM), or a combination thereof. In an embodiment, memory 201 may include more than one type of memory, such as ROM for use at boot-up, and DRAM for program and data storage for use while executing programs. Storage 206 may comprise any suitable non-transitory storage device configured to store data, programs, and other information and to make the data, programs, and other information accessible via bus 209. Storage 206 may comprises, for example, one or more of a solid state drive, a hard disk drive, a magnetic disk drive, an optical disk drive, a secure digital (SD) memory card, and the like.

I/O devices 208 include, for example, user interface devices such as a display device, including a touch-sensitive display device capable of displaying rendered images as output and receiving input in the form of touches. In some embodiments, I/O devices 208 additionally or alternatively include one or more of speakers, microphones, cameras, sensors such as accelerometers and global positioning system (GPS) receivers, keypads, or the like. In some embodiments, I/O devices 208 include ports for connecting client 102 to other client devices. In an example embodiment, I/O devices 208 include a universal serial bus (USB) controller for connection to peripherals or to host computing devices.

Network interface 210 is capable of connecting computing device 102 to a communication network 214. In some embodiments, network interface 210 includes one or more of wired interfaces (e.g. wired Ethernet) and wireless radios, such as WiFi, Bluetooth, or cellular (e.g. GPRS, GSM, EDGE, CDMA, LTE, or the like). Network interface 210 enables computing device 102 to communicate with other computing devices, such as a server, via the communications network 214. Network interface 210 can also be used to establish virtual network interfaces, such as a Virtual Private Network (VPN).

Figure 2:
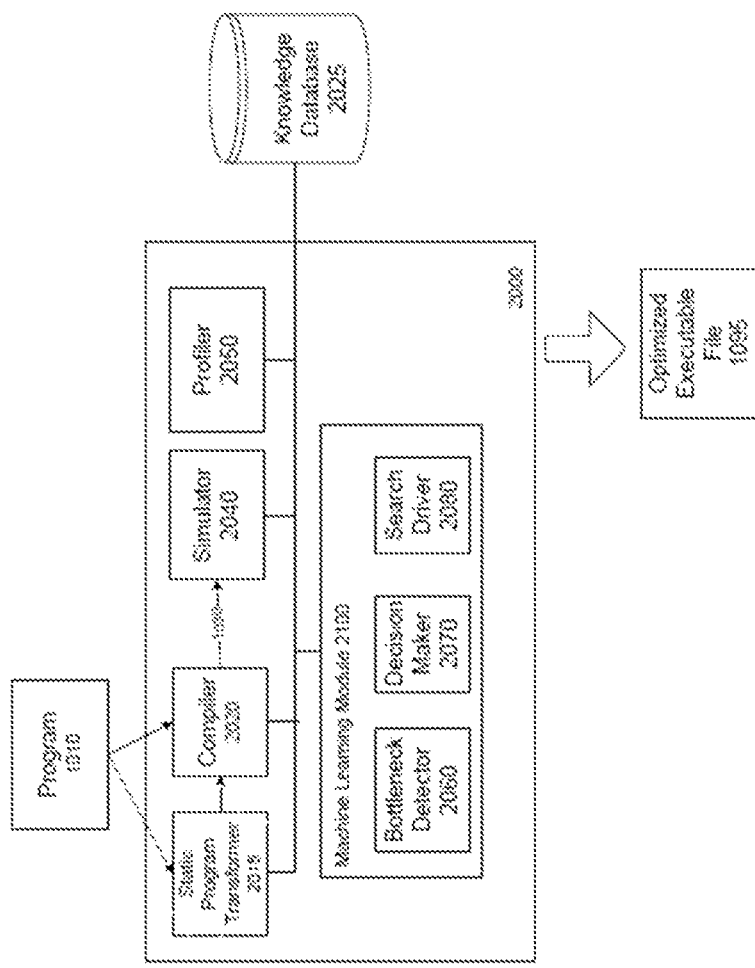
FIG. 2 is a block diagram depicting a logical representation of components of an example compiler software system.

Computing device 102 may implement a compiler software system comprising a plurality of modules for compiling source code of a software program into object code and generating an executable file for execution on a processor having a particular architecture. Each module may include computer-readable instructions which are executable by the processor 201 (and optionally accelerator 202) of computing device 102. FIG. 2 is a block diagram depicting a logical representation of components of an example compiler software system 2000 (referred to hereinafter as compiler system 2000). One or more processors 201 can execute instructions in memory 204 that implement software modules or units of the compiler system 2000. The compiler system 2000 includes compiler module 2020 (hereinafter referred to as compiler 2020), simulator 2040 module (hereinafter referred to as simulator 2040), profiler module 2050 (hereinafter referred to as profiler 2050), and machine learning module 2100. In some embodiments, compiler system 2000 further includes an optional static program transformer module 2015 (hereinafter referred to as static program transformer 2015) which pre-processes the source code of a software program low to transform the source code of the software program 1010 into auto-tuning enabled source code by identifying and inserting performance parameters (that is, performance parameters which can be adjusted prior to compiling the source code in order to affect optimizations performed by compiler 2020 during compiling of the source code of the software program) and to generate static analysis data as described in further detail below. In this embodiment, the auto-tuning enabled source code is provided to the compiler 2020 for compiling and generation of an executable file that is executable on the processor. As depicted, machine learning module 2100 includes bottleneck detector 2060, decision maker 2070, and search driver 2080.

As depicted in FIG. 2, the computer-readable instructions of the modules of the compiler system 2000 are executed by the processor 201 of the computing device 102. In other embodiments, computer-readable instructions of one or more modules of the compiler system 2000 may be executed by one or more computing devices remote from computing device 102. In some embodiments, the compiler system 2000 interacts with persistent storage that includes a knowledge database 2025. In some embodiments, storage device 206 of computing device 102 includes the knowledge database 2025. In some embodiments, the knowledge database 2025 may be stored in remote persistent storage that is accessible by computing device 102. In some embodiments in which the knowledge database is stored in remote persistent storage, computing device 102 does not necessarily include storage 206. The compiler system 2000 is configured to receive a software program 1010 (or an auto-tuning enabled software program as described in further detail below). The software program 1010 may be received from a remote computing device. Alternatively, the software program 1010 may be stored locally in storage device 206 of computing device 102 and received by the compiler 2020. In some embodiments, the compiler system 2000 is configured to receive the auto-tuning enabled software program, compile the source code of the auto-tuning enabled software program 1010 into object code and generate one or more executable files 1030 from the object code, select one of the one or more generated executable files 1030, and output the selected executable file as an optimized executable file 1095, as described in further detail below. Each executable file 1030 generated by the compiler system is executable on a processor having a particular architecture. The optimized executable file 1095 is optimized for more efficient performance on the processor having the particular architecture. A person skilled in the art will appreciate that the use of the term "optimized for more efficient performance" means that the executable file 1095 output by the compiler system 2000 exhibits an improvement in at least one execution metric relative to an execution file generated by a conventional compiler for execution on the processor having the particular architecture.

Figure 3A:
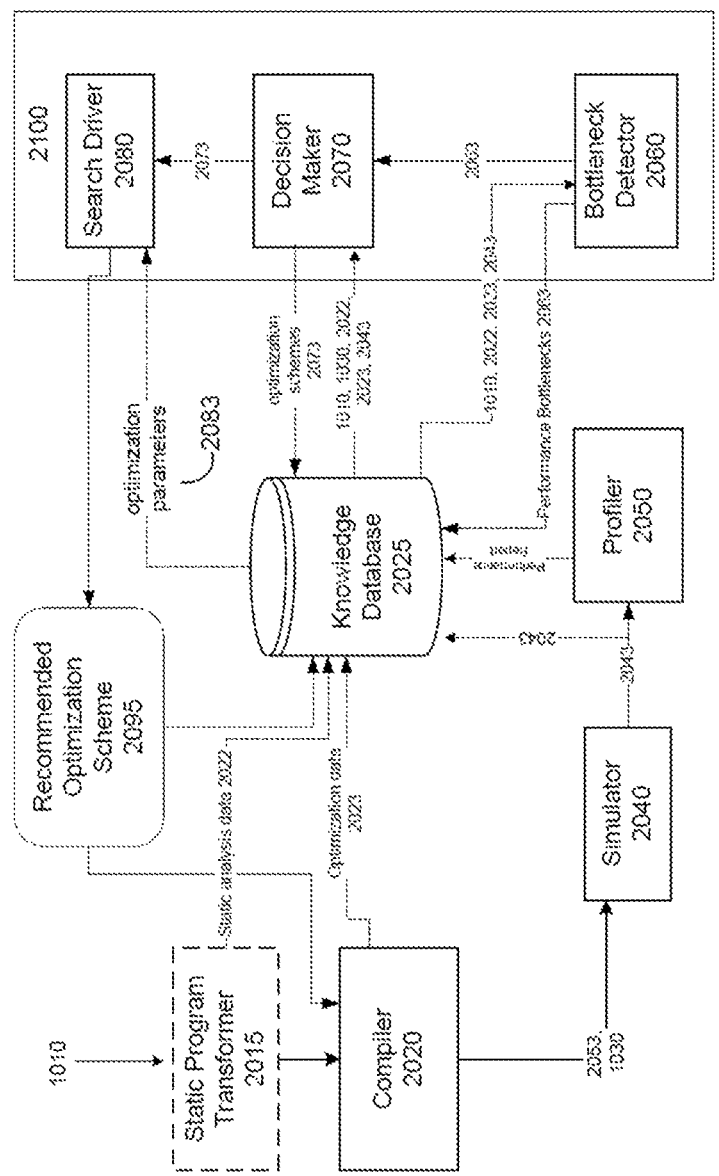
FIG. 3A is a block diagram of a workflow depicting an example method of auto-tuning and optimizing software program using the compiler system.

FIG. 3A is a block diagram of a workflow depicting an example method of auto-tuning and optimizing source code of a software program 1010 using the compiler system 2000. Software program 1010 may be an auto-tuned enabled software program that includes one or more adjustable or tunable performance parameters in the source code of the software program 1010. Alternatively, the software program 1030 may not be auto-tuning enabled, but may include annotations included in the source code by the software program developer indicative of performance hints.

In some embodiments, compiler system 2000 includes static program transformer module 2015. Static program transformer module 2015 is configured to analyze the source code of the software program 1010. Upon analyzing the source code of the software program 1010, static program transformer module 2015 may pre-process the software program 1010 to transform and/or annotate the source code of the software program 1010 to generate an auto-tuning enabled software program comprising auto-tuning enabled source code (e.g. source code which is enabled for auto-tuning by the complier 2020). Enabling the source code of a software program 1010 for auto-tuning by the complier 2020 may include parameterizing the source code of the software program 1010 to identify or add performance parameters associated with various transformations. The performance parameters provide flexibility to compiler 2020 to facilitate optimization during compiling. Examples of performance parameters include optimization directives/pragmas associated with transformations which are performed by the compiler 2020 during compiling to convert the source code to object code and to generate an executable file.

Static program transformer module 2015 (optional) is also configured to generate static analysis data 2022 when pre-processing the source code of software program 1010. As described herein, static analysis data 2022 includes data indicative of recommendations or suggestions as to particular areas of the source code of the software program 1010 that may be suitable for certain types of optimizations. In embodiments which do not include static program transformer module 2015, compiler 2020 may automatically generate an optimization scheme for the source code of the software program 1010. In some embodiments, the source code of software program 1010 may include annotations provided by the software program developer which provides the aforementioned recommendations and suggestions. In some embodiments, static analysis data 2022 is stored in the knowledge database 2025.

In some embodiments, the static program transformer module 2015 may be omitted from complier system 2000 and software program 1010 may be sent to directly compiler 2020 (e.g. without first sending the software program 1010 to static program transformer module 2015). In this embodiment, the software program 1010 received by the complier system 2000 may already be auto-tuning enabled.

Compiler 2020 is configured to compile the auto-tuning enabled software program (e.g. the source code of the auto-tuning enabled software program to object code and produce an executable file 1030). In some embodiments, compiler 2020 is configured to automatically adjust or tune performance parameters associated with transformations (referred to herein as "auto-tuning") during compiling of the source code of the auto-tuning enabled software program. Alternatively, compiler 2020 analyzes the auto-tuning enabled software program and generates information regarding possible source code transformations and associated performance parameters for use when compiling the source code of auto-tuning enabled software program. Performance parameters may include, for example, tiling size, unroll factors, invariant code motions, inline thresholds, or the like. Compiler 2020 may determine what optimizations can be performed on the source code of the auto-tuning enabled software program, as well as what optimizations cannot be performed at one or more specific lines of the source code of the auto-tuning enabled software program.

The compiler 2020 is configured to compile the source code of the auto-tuning enabled software program and generate an executable file 1030. Compiling the source code of the software program 1010 comprises transforming the source code of the auto-tuning enabled software program 1010 into object code. During compiling, the compiler 2020 may select one or more optimization schemes. As used herein, the expression "search space" refers to the set of all possible optimization schemes which can be applied to the source code of the auto-tuning enabled software program. In some embodiments, the compiling system is configured to generate a search space and then select one optimization scheme (e.g., recommend optimization scheme 2095) expected to yield the executable file with the best performance on the particular processor. The compiler 2020 may perform one or more transformations on the source code of the auto-tuning enable software program in a specific order based at least in part on the possible transformations and associated performance parameters (i.e. the possible optimizations) identified during the analysis of the source code of the software program 1010. The compiler 2020 is further configured to provide fine-grain control over compiling, for example by allowing for optimizations to be applied to specific source code regions, loops, functions, and the like of the source code of the auto-tuning enabled software program during compiling.

In some embodiments, compiler 2020 includes a high-level optimizer (which may make optimizations which are processor independent and/or processor architecture-independent) and a low-level optimizer (which may make optimizations which are dependent on characteristics of the processor and/or the processor architecture of the processor.

In some embodiments, compiler 2020 is configured to output an indication 2053 of which particular types of data (e.g. trace information and run-time execution data) should be gathered during simulation by simulator 2040. Indication 2053 is received by simulator 2040. Simulator 2040 may base the types of data gathered and stored during executions or simulations of the executable file 1030 generated by compiler 2020 at least in part on the indication received from compiler 2020. After completing compiling of the source code of the auto-tuning enabled software program, compiler 2020 outputs an executable file 1030.

Compiler 2020 is further configured to generate and output optimization data 2023 pertaining to the compiling of the source code of the auto-tuning enabled software program. Examples of optimization data 2023 include at least data indicative of the types of transformations performed on the source code of the auto-tuning enabled software program, data indicative of the order in which transformations were performed, data indicative of optimization phases, orders, and possible performance parameters. The optimization data 2023 is stored in a compiling report 1023. The compiling report 1023 may be transmitted to knowledge database 2025 for storage. The compiling report 1023 may be in any appropriate file format, such as an XML file. Compiler 2020 may generate a compiling report 1023 each time the source code of the auto-tuning enabled software program is compiled. In some embodiments, the optimization data 2023 may include data regarding characteristics of the auto-tuning enabled software program and transformations applied to the source code of the auto-tuning enabled software program during compiling, such as register pressure, instruction scheduling, tiling size, unroll factors, invariant code motions, inline thresholds, the addition of performance parameters, or the like.

In some embodiments, the compiling report 1023 comprises one or more of an identifier for the auto-tuning enabled software program, one or more locations of particular functions or lines or code in the source code of the auto-tuning enabled software program, one or more performance parameters that can be adjusted in relation to a particular function or lines of code, and an identifier corresponding to one or more actions performed by compiler 2020. The compiling report 1023 may be stored in knowledge database 2025 and used in subsequent iterations as described below.

In some embodiments, the compiling report 1023 is an XML file including fields for one or more of <location>, <transID>, <performance parameter>, and <ActionID>. The <Location> field may include sub-fields such as <file, func, loop, line>, which identify a precise location within the source code of the software program 1010. The file field represents a file ID for the program. The func field represents a function within the <file> of the program. The loop field represents a loop ID in the function <func>. The line field represents a line number within the program. Therefore, a compiling report 1023 may include lines of information in the format of <File, Func, Loop, Line, transID, performance parameter, ActionID>, where a specific transformation, performance parameter, and/or action performed by the compiler is identified at a specific location within program 1010. For example, the <transID> may correspond to a loop unrolling. The <performance parameter> may correspond to an unroll factor. The loop unrolling may be performed by the compiler 2020 for the loop at a location in the source code of the auto-tuning enabled software program identified by <File name, Function name, Loop ID> with Line number <Line>. In some embodiments, compiler 2020 can predict performance based on one or more performance models stored in knowledge database 2025, based on past performance.

Knowledge database 2025 stores data pertaining to the compiling of the source code of the auto-tuning enabled software program and data pertaining to previously compiled source code of other software programs. Such data may include, for example, data indicative of characteristics of the auto-tuning enabled software program, data indicative of previously determined optimization schemes for other previously compiled software programs, data indicative of static compiler analysis information, data indicative of dynamic profiling information including processor performance counter data, trace information from simulator 2040, and the like. In some embodiments, knowledge database 2025 is a relational database. Data stored in knowledge database 2025 can be accessed and retrieved in real time or near real time for performing data mining and machine learning by machine learning module 2100 as described in further detail below.

Upon generating executable file 1030, compiler 2020 sends the executable file 1030 to simulator 2040. Simulator 2040 is configured to simulate execution of the executable file 1030 on a processor the executable file 1030 is to be executed on. As described herein, a processor may include one or more of pipelines and cache memory. Simulator 2040 receives executable file 1030 and simulates execution of executable file 1030 on the processor. In some embodiments, simulator 2040 is configured to simulate execution of the executable file 1030 on a plurality of processors having different architectures. For example, simulator 2040 may simulate execution of the executable file 1030 on one or more of an ARM 64, GPU, DSP, or FPGA. Simulator 2040 may also be configured to simulate execution of the executable file 1030 on proprietary or a customized processor. In some embodiments, computing device 102 on which compiler system 2000 is running includes one or more processors. In these embodiments, the executable file 1030 generated by the compiler 2020 can be executed on the actual processor the executable file 1030 is to be executed on and dynamic data 2043 can be generated and/or recorded. For example, executable file 1030 generated when the source code of the auto-tuning enabled software program is compiled for execution on the processor 201 of computing device 102 can be executed on the processor 201 of computing device 102 and dynamic data 2043 captured during the execution of the executable file 1030 can be sent to knowledge database 2025. As described herein, simulator 2040 includes one or more of software simulation of the executable file 1030 generated by the complier 2020 and actual execution of the executable file 1030 on a processor having a particular architecture. In still other embodiments, computing device 102 might not include the particular processor for which the executable file is optimized, and the executable file 1030 may be sent to a different computing device which does include the particular processor for which the executable file is optimized, and the executable file 1030 can be executed on the actual processor the executable file 1030 is to be executed on and dynamic data 2043 can be generated and/or recorded and returned to the knowledge database 2025 from the different computing device.

During run-time (e.g. execution and/or simulation) of the executable file 1030, dynamic information (collectively referred to herein as dynamic data 2043) are collected and transmitted to knowledge database 2025 for storage. In some embodiments, the dynamic data 2043 may be analyzed to generate one or more performance models for executable file 1030. In some embodiments, dynamic information includes one or more of machine cycles, stalls, cache misses, branch miss predictions, memory trace data, register counts, pipeline stalls, memory access counts, performance counters, cycle accuracy information, memory register information, and the like. Run-time execution information may include, for example, register spills and other performance issues which occurred during simulation or execution of the executable file generated by the compiler system 2000.

Profiler 2050 of compiler system 2000 is configured to collect dynamic data 2043 and generate a performance report. In some embodiments, the simulator 2040 can evaluate the performance of the execution of the executable file 1030 on a processor having a particular architecture through performance modeling, cycle accuracy information, performance counters, and so on. In some embodiments, profiler 2050 transmits the performance report for the executable 1030 to knowledge database 2025 for storage.

Compiler system 2000 further includes machine learning module 2100, which includes bottleneck detector 2060, decision maker 2070 and search driver 2080. Bottleneck detector 2060 is configured to retrieve and analyze data stored in knowledge database 2025. In some embodiments, the data retrieved and analyzed by bottleneck detector 2060 includes at least one of the auto-tuning enabled software program, static analysis data 2022, the compiling report 1023 including the optimization data 2023 included in the compiling report 1023, and dynamic data 2043 to evaluate the performance of the execution of the executable file 1030 on a particular hardware platform. Bottleneck detector 2060 classifies and identifies bottlenecks in the executable file 1030. In some embodiments, identification and classification of bottlenecks is based on observed errors, processing delays, or hot spots during execution or simulation of executable file 1030. In some embodiments, bottleneck detector 2060 may apply machine learning techniques to identify bottlenecks in the executable file 1030 and classify the identified bottleneck as a type of bottleneck. Types of bottlenecks may include memory access bottlenecks, floating point bottlenecks, fixed point bottlenecks, pipeline bottlenecks, and the like.

In some embodiments, the bottleneck detector 2060 generates an electronic record (depicted as performance bottlenecks 2063) which includes a location of a particular bottleneck in the executable file 1030, an identification of the type of bottleneck, and a recommended action to ameliorate the bottleneck. In some embodiments, the electronic record may be an XML file or any suitable file format which includes fields such as <location <File, Func, Loop, Line>, bottleneckID, ActionID, where the bottleneckID represents a particular type of bottleneck. The performance bottlenecks 2063 may be transmitted for storage in knowledge database 2025.

In some embodiments, bottleneck detector 2060 is configured to identify bottlenecks in executable file 1030 based on historical data stored in knowledge database 2025. Historical data may include one or more of: information regarding a plurality of previously generated executable files generated by compiler 2020 using different optimization schemes and based on the same auto-tuning enabled software program), and information relating to other previously compiled software programs. For example, historical data may include data representative of one or more of hot spots (code regions in which a relatively large amount of time or resources are consumed relative to other code regions in the auto-tuning enabled software program) and bottlenecks previously identified in software programs or executable files that are similar or identical to the auto-tuning enabled software program being compiled by compiler 2020. In some cases, bottleneck detector 2060 can implement machine learning techniques to determine potential hot spots or bottlenecks within the source code of the auto-tuning enabled software program or the executable file 1030.

Decision maker 2070 is configured to interact with bottleneck detector 2060 and knowledge database 2025 to evaluate performance impacts of various optimization schemes. Decision maker 2070 is further configured to perform data mining on the data in knowledge database 2025 and apply machine learning techniques based on training data obtained from knowledge database 2025 to identify possible workarounds or transformations which may ameliorate or alleviate the performance limitations caused by the bottlenecks and hot spots in the executable file 1030. In some embodiments, decision maker 2070 analyzes the source code of the auto-tuning enabled software program and analyzes the executable file 1030, evaluates performance impacts based on one or more of static analysis data 2022, optimization data 2023, dynamic data 2043, and performance bottlenecks 2063, and proposes possible optimization schemes 2073 (e.g. particular transformations for a portion of the source code of the auto-tuning enabled software program 110), for each of one or more portions of auto-tuning enabled software program).

Search driver 2080 is configured to retrieve optimization parameters 2083 from knowledge database 2025 and configure a search space and search strategies based on the optimization parameters to find a recommended optimization scheme 2095 from the various optimization schemes determined by decision maker 2070 for compiling the source code of the auto-tuning enabled software program. Based on optimization parameters received from knowledge database 2025, search driver 2080 is configured to retrieve or otherwise determine optimization parameters 2083 for each of the possible optimization schemes 2073 determined by decision maker 2070 and select one of the optimization schemes determined by decision maker 2070 as the recommended optimization scheme 2095. As described herein, optimization parameters 2083 may include one or more of dynamic data 2043 obtained from previous executions of executable files, and any static analysis data 2022 and optimization data 2023 associated with the previously executed executable files. In some embodiments, determining a recommended optimization scheme 2095 includes executing the compiler multiple times, and evaluating the performance of each resulting executable file.

For example, search driver 2080 can determine, based on machine learning techniques, an appropriate range of inputs for nested transformations with different unroll-and-jam unrolling factors, as well as appropriate types of data prefetching schemes (e.g. data touch or stream prefetching, depending upon the processor that will be executing the executable file 1030). In some embodiments, search driver 2080 iteratively evaluates the performance results for each set of optimization parameters 2083 for each optimization scheme 2073, and iteratively searches for and determines a recommended optimization scheme 2095 from the various optimization schemes determined by the decision maker 2070 for compiling the source code of the program 1010.

In some embodiments, compiler system 2000 optimizes the compiling of the source code of the auto-tuning enabled program in a multi-stage or multi-level manner. That is, the compiler system 2000 uses machine learning to analyze the various optimization scheme determined by the decision maker 2070 and determine a recommended optimization scheme 2095 for optimizing the source code of the auto-tuning enabled software program for execution on a particular processor.

Figure 3B:
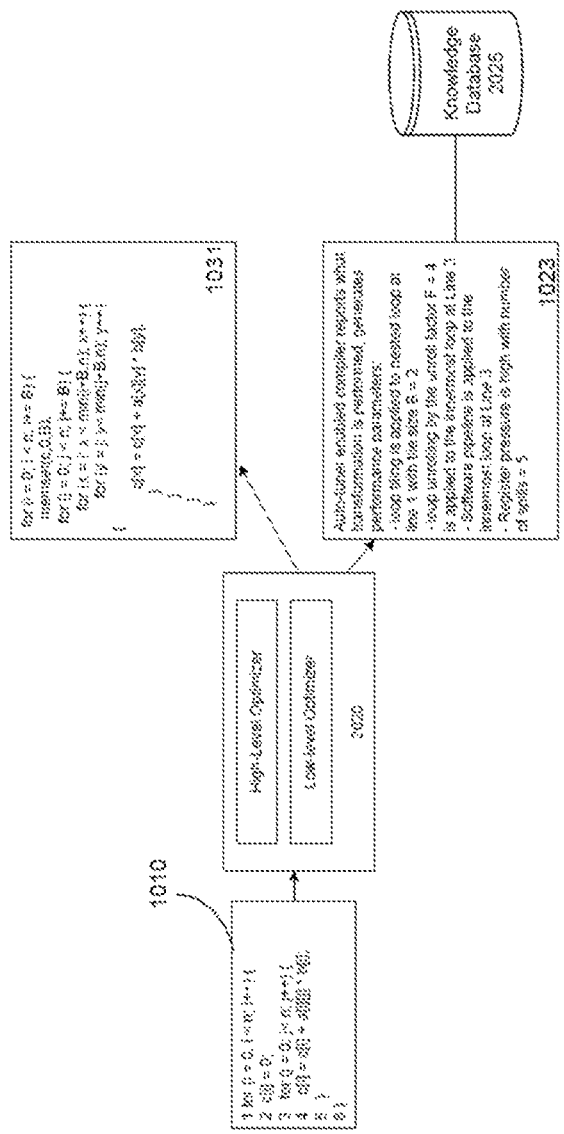
FIG. 3B depicts an expanded view of auto-tuning enabled compiler component in FIG. 3A.

FIG. 3B depicts an example workflow performed by compiler 2020. As depicted, compiler 2020 receives source code of the auto-tuning enabled software program 1010. As depicted, the source code of the auto-tuning enabled software program 1010 contains a nested loop. Compiler 2020 is configured to perform high-level optimization and low-level optimization on the source code of the auto-tuning enabled software program 1010 and compiles the optimized source code to generate optimized source code 1031. In this example, it can be seen that while the source code of the auto-tuning enabled software program 1010 contains two nested loops, the optimized source code 1031 contains four nested loops. This is an example of a loop transformation which may be performed by the compiler 2020 in accordance with an optimization scheme while converting the source code of the auto-tuning enabled software program 1010 to optimized source code 1031. A compiling report 1023 can be generated when generating the first executable file 1030. The compiling report 1023 includes one or more of static analysis data 2022 and optimization data 2023.

As depicted, compiling report 1023 includes information regarding performance parameters associated with different transformations performed on the source code of the auto-tuning enabled software program 1010, which can be represented by a string including identifiers such as file, function, loop, line, transID and Action ID. The file, function, loop and line identifiers denote a specific location of one or more lines of code in first executable file 1030. TransID represents a transformation applied to the one or more lines of source code, and Action ID represents an action applied to the one or more lines of source code.

For example, a first transformation applied by compiler 2020 to the source code the auto-tuning enabled software program 1010 is a loop tiling applied to a loop nest, with an associated performance parameter being the tile size B=2 at line 1 of the source code of the auto-tuning enabled software program 1010. A second transformation is a loop unrolling with an associated performance parameter being the unroll factor F=4 applied to the inner loop at line 3 of the source code of the auto-tuning enabled software program 1010. A third transformation is a software pipeline applied to the inner loop at line 3. First executable file 1030 is generated by applying these transformations to the source code of the software program 1010.

In some embodiments, the compiling report 1023 includes information regarding likely performance issues associated with first executable file 1030 after being compiled by compiler 2020. For example, the compiling report 1023 can indicate that register pressure is high due to a high number of spills (5) (i.e. a requirement to move 5 variables from registers to another location in memory, which indicates that there is insufficient register space available to execute first executable file 1030 under ideal conditions) for first executable file 1030.

Figure 4:
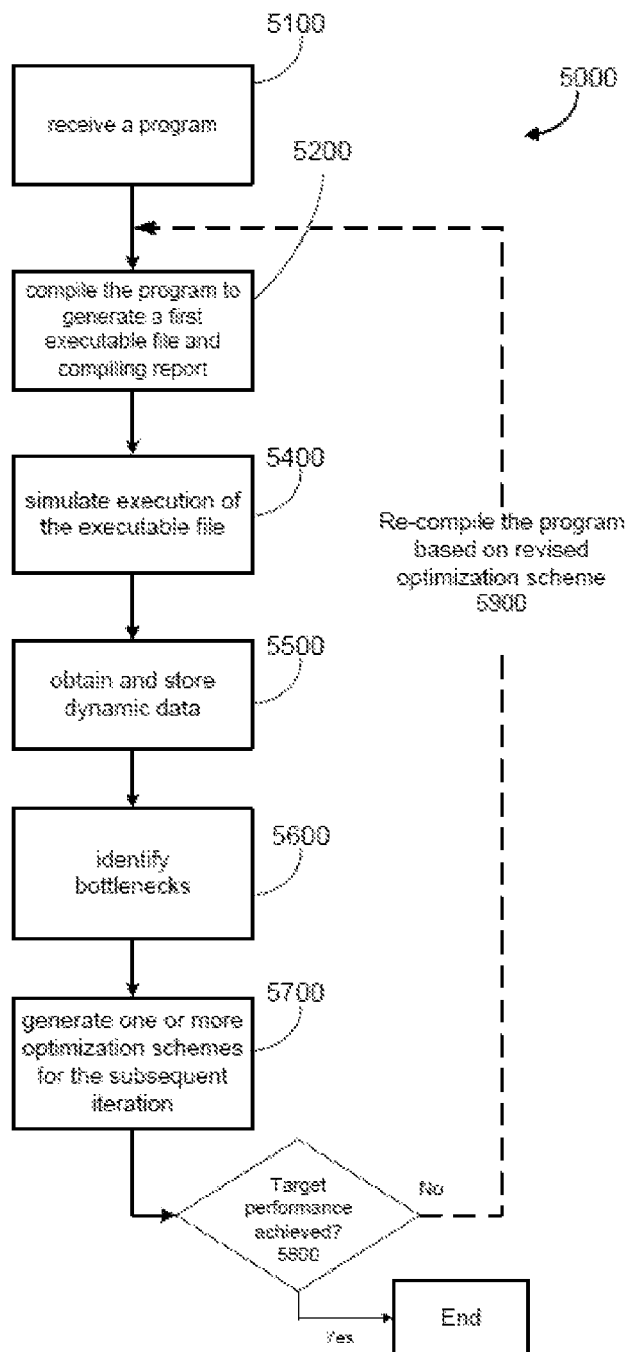
FIG. 4 is a flow chart depicting an example method of operation of a compiler system when executed on a processor and accelerator of a computing device.

FIG. 4 is a flow chart depicting an example method 5000 of operation of compiler system 2000 when executed on processor 201 and accelerator 202 of computing device 102. Processor 201 of computing device 102 executes instructions of compiler system 2000 to cause processor 201 to perform method 5000. At 5100, method 5000 retrieves or receives an auto-tuning enabled software program 1010 for compiling.

At 5200, the source code of the auto-tuning enabled software program 1010 is compiled by compiler 2020 to generate a first executable file 1030. In some embodiments, the source code of the auto-tuning enabled software program 1010 is analyzed by static program transformer 2015 and/or compiler 2020 to identify performance parameters which may be adjusted to different values during subsequent compilations of the source code of the auto-tuning enabled software program 1010 to produce different executable files 1030. For example, the value of a loop tiling size or a loop unrolling factor may be adjusted.

In some embodiments, compiler 2020 is configured to generate a second executable file in an iterative manner. In some embodiments, the optimization scheme for a generating a second executable file may be based at least in part on the performance data resulting from execution and/or simulation of a first executable file 1030. The results of simulation of execution of the first executable file 1030 may be stored in knowledge database 2025.

When the executable file 1030 is generated, method 5000 generates a compiling report 1023 that includes one or more of: static analysis data 2022 and optimization data 2023. One or more of compiling report 1023, static analysis data 2022 and optimization data 2023 may be stored in knowledge database 2025.

At 5400, execution of the executable file 1030 on a processor having a particular architecture is simulated. Alternatively, at 5400, the executable file 1030 is executed on the processor. For example, if the compiler 2020 compiles the source code of the auto-tuning enabled software program 1010 and generates an execution file 1030 for execution on processor 201 of computing device 102, the executable file 1030 may be executed by processor 201. At 5500, dynamic data 2043 is obtained based on simulation or execution of the executable file 1030 and stored in knowledge database 2025. At 5600, bottleneck detector 2060 identifies one or more bottlenecks in the executable file 1030. The bottlenecks may be present at one or more locations in executable file 1030 (e.g. sequences of code or instructions) based on the dynamic data 2043. For example, the dynamic data 2043 may be analyzed and the analysis may reveal that a relatively large amount of time and/or resources are used at a particular portion of executable file 1030.

At 5700, the method 5000 generates one or more optimization recommendations regarding at least one of the one or more bottlenecks. The optimization recommendations may be based on one or more of static analysis data 2022, optimization data 2023 and dynamic data 2043 stored in knowledge database 2025. Knowledge database 2025 may contain static analysis data 2022, optimization data 2023, and dynamic data 2043 obtained from previous simulations of execution of executable files. Knowledge database 2025 can be mined for historical static 2022 and dynamic 2043 data, which is used in determining optimization schemes.

At 5800, the method 5000 determines whether the execution of executable 1030 achieved a target performance metric. If the target performance has been achieved, then the method 5000 ends. If the target performance has not been achieved, then the optimization recommendation(s) may form part of an optimization scheme which may be applied to a subsequent compilation of the auto-tuning enabled software program low at 5900.

In some embodiments, blocks 5200, 5400, 5500, 5600, 5700, 5800 and 5900 may be performed more than one time. After block 5900, compiler 2020 at block 5200 compiles the auto-tuning enabled software program 1010 using a modified optimization scheme based at least in part on the one or more optimization recommendations generated at 5700. For example, the optimization scheme may involve applying a transformation (e.g. loop tiling) which was not applied the first time compiler 2020 compiled the auto-tuning enabled software program 1010. Moreover, in some embodiments, the modified optimization scheme may adjust previously identified performance parameters in the auto-tuning enabled software program 1010, which may further impact the execution performance of executable file 1030. For example, a loop unrolling factor may be 4 when block 5200 is first performed, and may be modified to 3 when block 5200 is subsequently performed after block 5900. The process of performing iterations of method 5000 may be automatic and/or ongoing. In some embodiments, iterations of method 5000 may continue until a particular performance target has been achieved by an executable file 1030 at 5800. Examples of performance targets may include a specific execution time duration (e.g. 5 seconds), execution without any register spills, with no pipeline stalls, with no cache misses, or the like, on one or more processors. Performance targets, which are also referred to as optimization targets, can be determined automatically or through manual user input.

In embodiments with multiple iterations of method 5000, a first executable file 1030 is generated by compiler 2020 using a first optimization scheme, and a second executable file 1030 is generated by compiler 2020 using a second optimization scheme based at least in part on the optimization recommendations generated at 5700 after simulating execution of the first executable file 1030. In a third iteration of method 5000, a third optimization scheme can be generated at 5700 based on optimization recommendations from the simulation of execution of the first and second executable files 1030. The third optimization scheme can be used by compiler 2020 when compiling the auto-tuning enabled software program 1010 to generate a third executable file 1030.

In some embodiments, the one or more optimization schemes at 5700 may be based on the one or more bottlenecks identified at 5600. For example, if an identified bottleneck is due to cache access misses, the compiler system 2000 may recommend applying a nested loop transformation to appropriate loops in the source code of the auto-tuning enabled software program 1010 to reorder the computations and reduce cache misses.

In one example, the source code of the auto-tuning enabled software program 1010 contains a nested loop. The compiling report 1023 generated by compiler 2020 may identify the nested loop as a hot spot or bottleneck, which is a region of the source code which is of critical importance to the overall performance of the auto-tuning enabled software program 1010. The compiling report 1023 may also indicate that a nested loop transformation (e.g. unroll-and-jam) can be applied to the nested loop. Further, trace information in the dynamic data 2043 obtained from the simulator 2040 may indicate that there is a performance bottleneck due to memory access stalls. Further, knowledge database 2025 may be mined for data from static analysis data 2022 and the dynamic data 2043 of previous iterations which indicates that there are three (3) optimization schemes 2073 which may be applied to the area of the source code of the auto-tuning enabled software program 1010 causing these performance issues. Such optimizations may include, for example, (1) computation reordering by nested loop transformations, such as unroll-and-jam, loop interchange, or loop tiling; (2) improving memory latency by data prefetching; and (3) data layout reorganization for locality. Decision maker 2070 may then determine that nested loop transformations and data prefetching are preferred optimizations based on the behavior (e.g. loop structure, loop upper bounds, memory access latency, memory access and computation ratio, or the like) of the auto-tuning enabled software program 1010. The optimization schemes 2073 can be sent to knowledge database 2025 for storage and subsequent analysis.

Search driver 2080 then configures a search space which includes inputs for loop transformations (e.g. with different unroll-and-jam factors, or the like), data pre-fetching schemes (data touch, stream prefetching, or the like), and iteratively searches for the optimization scheme 2073 which produces the best anticipated performance results.

In certain scenarios, certain transformations might not be suitable. For example, a nested loop transformation might not be suitable if data dependency issues exist within the source code of the auto-tuning enabled software program 1010. In some embodiments, compiler 2020 may identify a possible data dependency issue within the source code of the auto-tuning enabled software program 1010 based on, for example, historical static analysis data 2022 or dynamic data 2043 in knowledge database 2025. If the compiler identifies a possible data dependency issue, compiler 2020 may be configured to receive an instruction confirming or denying the existence of a data dependency issue. In some embodiments, the instruction confirming or denying the data dependency issue is generated manually by a programmer or user of compiler system 2000. In some embodiments, the data dependency issue is confirmed based on historical data in knowledge database 2025 or on dynamic data 2043 generated by simulator 2040. In some embodiments, machine learning module 2100 may determine that nested loop transformations and data prefetching are preferred optimization schemes based on the similarity of the structure of the source code of the auto-tuning enabled software program 1010 to the structure of training data in knowledge database 2025. As described herein, training data refers to the static analysis data 2022 and dynamic data 2043 of software programs with source code similar or identical to source code of the auto-tuning enabled software program 1010.

In another example, compiler 2020 may perform a transformation on the source code of the auto-tuning enabled software program 1010 using aggressive loop-invariant code motion. When compiler 2020 applies loop-invariant code motion, compiler 2020 may sort the loop invariants in order of computational cost and record the cost information in the compiling report 1023 for storage in knowledge database 2025. Simulator 2040 may identify performance issues or bottlenecks due to register pressure, and send dynamic performance data 2043 that includes data indicative of these performance issues or bottlenecks to the knowledge database 2025. Based on the information regarding computational costs and register pressure, search driver 2080 may configure the search space for the auto-tuning enabled software program 1010 to look for solutions to both issues. In some embodiments, machine learning module 2100 may sort possible optimization schemes with a priority given to a particular bottleneck or compiling issue in determining a recommended optimization scheme 2095.

Figure 5:
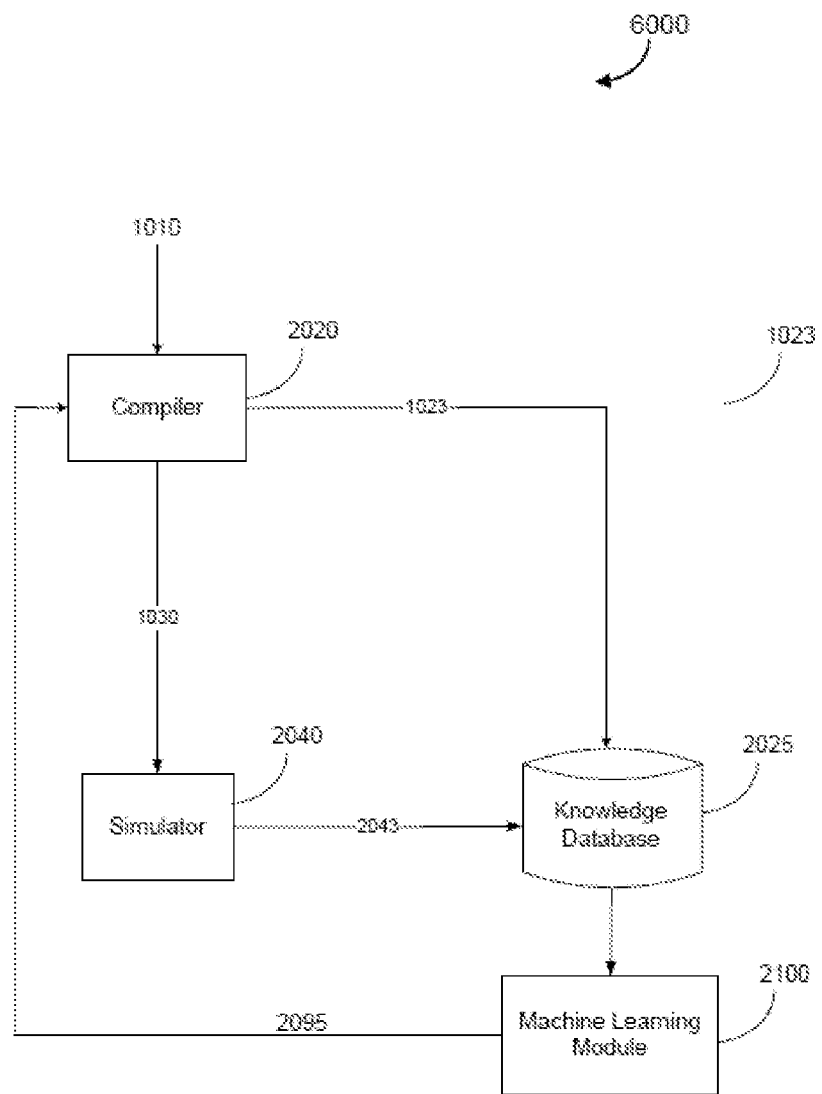
FIG. 5 is a flowchart depicting an example workflow for an automatic iterative process for optimizing and compiling a software program in accordance with another embodiment.

FIG. 5 is a modified flowchart depicting an example workflow 6000 for an automatic iterative process for optimizing and compiling an auto-tuning enabled software program low in accordance with another embodiment. Similar to the processes described above in relation to FIG. 3A, compiler 2020 receives source code of an auto-tuning enabled software program low. Compiler 2020 is configured to compile the source code of the auto-tuning enabled software program low in accordance with an optimization scheme to generate executable file 1030 for a processor having a particular architecture, and outputs the executable file for execution on the processor.

As depicted, after compiler 2020 completes compiling, compiler 2020 generates a compiling report 1023 and sends the compiling report 1023 to knowledge database 2025 for storage therein. Executable file 1030 generated and output by compiler 2020 is sent to a simulator 2040 for processing and analysis. Simulator 2040 simulates execution of the executable file 1030 of the processor having the particular architecture the executable file 1030 was generated for, generates dynamic data 2043, indicative of dynamic runtime information, and sends the dynamic data 2043 to knowledge database 2025 for storage thereon.

Machine learning module 2100 obtains various data from knowledge database 2025 and determines a recommended optimization scheme 2095. The recommended optimization scheme 2095 may include exact locations of optimizations to be applied to source code of the auto-tuning enabled software program low. In some embodiments, the recommended optimization scheme 2095 is determined by configuring a search space based on an identification of performance bottlenecks (by bottleneck detector 2060 (FIG. 3A) and other performance-related factors (e.g. the existence of high register pressure in a section of object code in executable file 1030), as well as possible solutions for addressing the bottlenecks and adjustments to tuning parameters.

Once the search space has been configured, search driver 2080 searches the various optimization schemes generated by the decision maker 2070 (FIG. 3A) for a recommended optimization scheme 2095. In some embodiments, bottleneck detector 2060, decision maker 2070 and search driver 2080 apply machine learning processes to training data stored in knowledge database 2025, which includes data from previously compiled, simulated, and executed programs and the resulting dynamic performance data. This information may be used by compiler 2020 in making automatic adjustments to performance parameters identified in the source code of the auto-tuning enabled software program 1010. Compiler 2020 then receives the recommended optimization scheme 2095 to guide any subsequent iterations of compiling the source code of the auto-tuning enabled software program 1010. In some embodiments, bottleneck information can be sent to compiler 2020 for further analysis and optimization.

Figure 6:
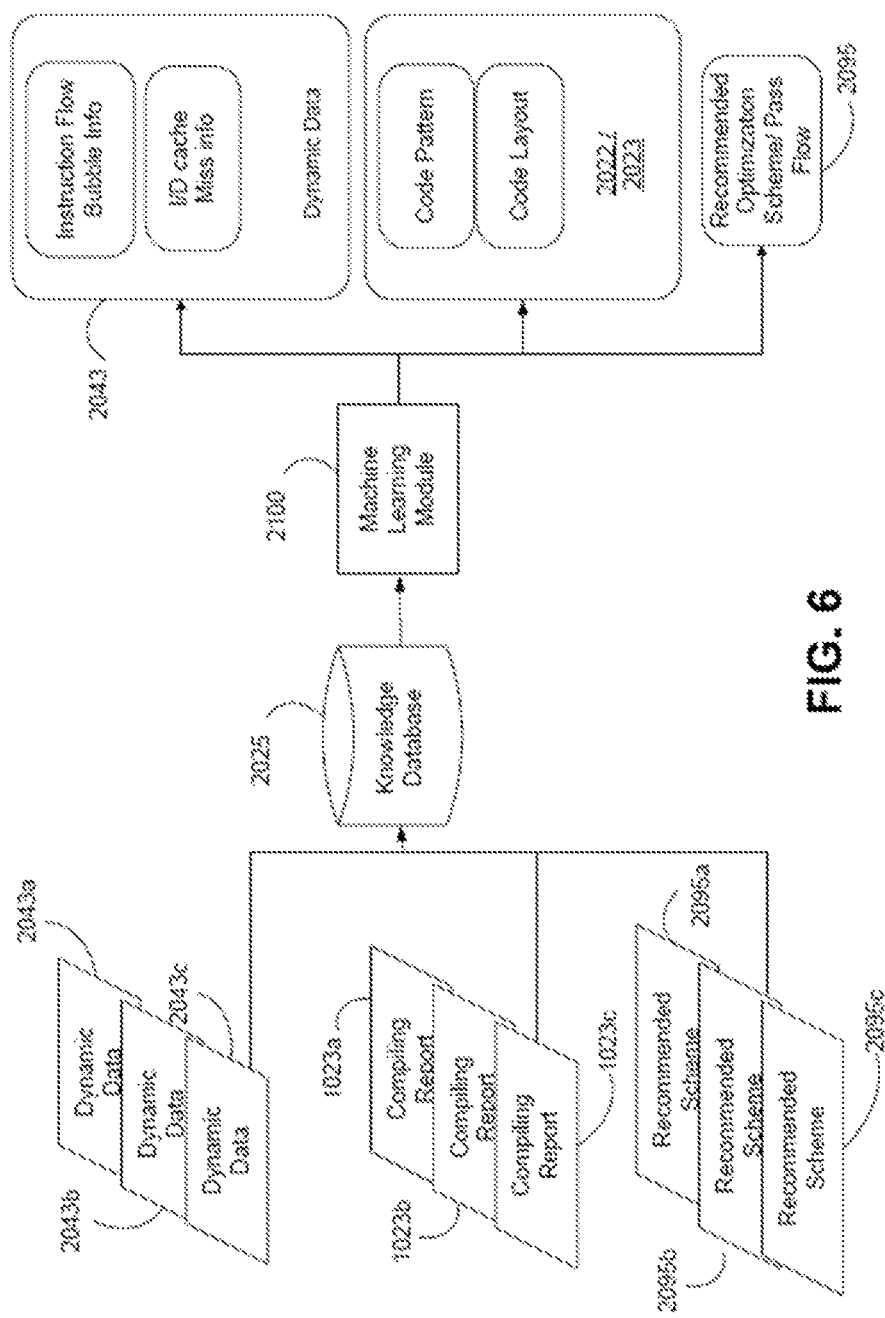
FIG. 6 is a flow chart depicting an example workflow for performing machine learning to generate an optimization scheme.

FIG. 6 is a block diagram depicting an example workflow for performing machine learning to modify or generate a function for machine learning module 2100 for generating a recommended optimization scheme 2095. Machine learning module 2100 may analyze training data to generate a function for generating an optimization scheme. Training data may include historical optimization data, which can include dynamic data 2043*a*, 2043*b*, 2043*c* from previously executed or simulated executable files 1030, data from compiling reports 1023*a*, 1023*b*, 1023*c* of previously compiled software programs 1010, which may include static analysis program characteristics data 2022 and optimization data 2023, and previously determined optimization schemes 2095*a*, 2095*b*, 2095*c*. The training data may relate to one or more previously compiled instances of the source code of the auto-tuning enabled software program 1010 or other software programs, as well as one or more previously executed or simulated instances of execution of the executable file 1030 on a processor. In some embodiments, the training data may be based on simulations and executions of the executable file on a plurality of processors. Once machine learning module 2100 has been trained, machine learning module 2100 can determine a recommended optimization scheme 2095 for the source code of the auto-tuning enabled software program 1010 or the source code of new software programs that are to be compiled into an execution file using compiler system 2000.

If a function for machine learning module 2100 has already been generated previously, machine learning module 2100 may use the optimization schemes 2095a, 2095b, 2095c, dynamic data 2043a, 2043b, 2043c, compiling reports 1023a, 1023b, 1023c as training data to further refine the function.

In some embodiments, machine learning module 2100 performs data mining and analyzes each set of dynamic data 2043, static program characteristic data 2022 and optimization data 2023 at to determine which optimization schemes 2095 resulted in the best individual performance metrics. Such performance metrics may include, for example, instruction flow bubble information (due to dependence, synchronization, resource limitations, etc.), data and instruction cache misses, code pattern, code layout, data layout/distribution, TLB (translation lookaside buffer) misses, TLB page walks, memory access (read/write) latency, memory bank conflicts, memory utilization, and various other metrics that would be known to a person skilled in the art.

Once the function of machine learning module 2100 is generated, machine learning module 2100 is operable to determine a recommended optimization scheme 2095 for compiler 2020 to apply at the next iteration of compiling the source code of the auto-tuning enabled software program 1010 using the mapping function. In some embodiments, a previously used optimization scheme 2095 already stored in knowledge database 2025 may be determined to be the recommended optimization scheme.

Figure 7:
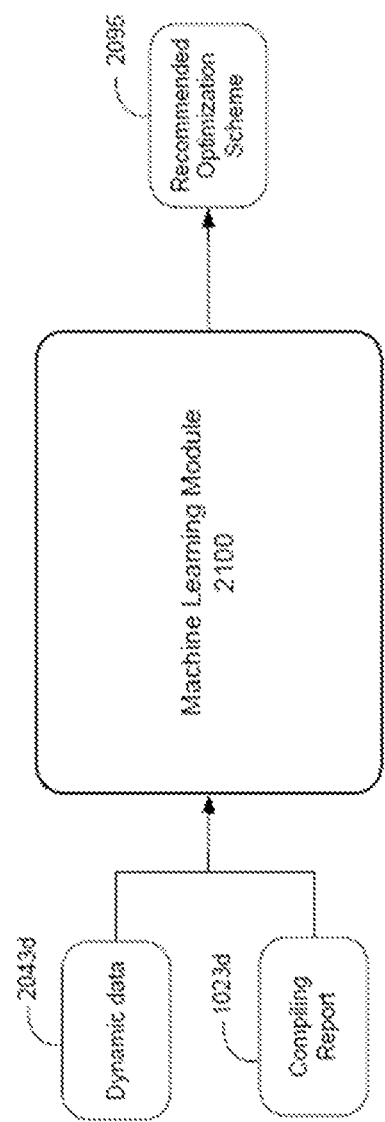
FIG. 7 is a flowchart depicting an example workflow for training a machine learning unit.

As shown in FIG. 7, which is an illustration of the operation of machine learning module 2100, machine learning module 2100 receives dynamic data 2043d and compiling report 1023d for the source code of a software program 1010, and outputs a recommended optimization scheme 2095 using the function of machine learning module 2100. The recommended optimization scheme 2095 is then used by the compiler 2020 when subsequently compiling the next iteration of the source code of software program 1010 to generate optimized executable file 1095.

FIG. 8 illustrates an example of optimizing the source code of a software program for execution on a convolutional neural network (CNN) operating on a multi-core processor that includes an AI core which includes multiple pipelines that communicate through shared memories and require explicit synchronization. As depicted, the CNN algorithm has 6 stages executing concurrently (depicted as 1 through 6) and each stage executes at different rate. As depicted, the data from stage 1 is used as an input for stages 2 and 3. The outputs of stages 2 and 3 are used as an input for stage 4. The output of stage 4 is used as an input for stage 5. The output of stage 5 is used as an input for stage 6. There is a possible synchronization requirement between stages. In applying compiling system 2000 to the CNN, the algorithm may be parameterized for the implementation of matrix data type sizes and other computations (e.g. parameterized matrix block size, parameterized pipelines, and synchronization). Search driver 2080 configures the search space with different matrix data sizes, different numbers of pipelines, and different unroll-and-jam transformations, and search driver 2080 evaluates the performance results of each permutation to arrive at an optimal solution. As shown in FIG. 9, as time goes on, it can be seen that the timing of the beginning of stage 5 becomes synchronized with the beginning of stage 6, so as to allow for more efficient execution.

Embodiments disclosed herein may improve the efficiency with which an optimized executable file 1095 generated from the source code of an auto-tuning enabled software program 1010 is executed on a processor having a particular architecture. Rather than relying on manual analysis by experts, compiling system 2000 described herein automatically determines an optimal or near-optimal optimization scheme 2095 to be implemented by the compiler 2020. The resulting optimized executable file 1095 may be executed on the processor having the particular architecture more efficiently than an executable file 1030 generated from the source code of auto-tuning enabled software program 1010 using a conventional compiler. This may allow for more efficient execution of optimized executable file 1095 on the processor having a particular architecture in general, and for improved performance of potentially any software program.

Embodiments disclosed herein may be implemented using hardware, software or some combination thereof. Based on such understandings, the technical solution may be embodied in the form of a software product. The software product may be stored in a non-volatile or non-transitory storage medium, which can be, for example, a compact disk read-only memory (CD-ROM), USB flash disk, a removable hard disk, flash memory, hard drive, or the like. The software product includes a number of instructions that enable a computing device (computer, server, mainframe, or network device) to execute the methods provided herein.

Program code may be applied to input data to perform the functions described herein and to generate output information. The output information is applied to one or more output devices. In some embodiments, the communication interface may be a network communication interface. In embodiments in which elements are combined, the communication interface may be a software communication interface, such as those for inter-process communication. In still other embodiments, there may be a combination of communication interfaces implemented as hardware, software, and/or combination thereof.

Each computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

The present disclosure may make numerous references to servers, services, interfaces, portals, platforms, or other systems formed from hardware devices. It should be appreciated that the use of such terms is deemed to represent one or more devices having at least one processor configured to execute software instructions stored on a computer readable tangible, non-transitory medium. One should further appreciate the disclosed computer-based algorithms, processes, methods, or other types of instruction sets can be embodied as a computer program product comprising a non-transitory, tangible computer readable media storing the instructions that cause a processor to execute the disclosed steps.

Various example embodiments are described herein. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments described herein are implemented by physical computer hardware embodiments. The embodiments described herein provide useful physical machines and particularly configured computer hardware arrangements of computing devices, servers, processors, memory, networks, for example. The embodiments described herein, for example, are directed to computer apparatuses, and methods implemented by computers through the processing and transformation of electronic data signals.

The embodiments described herein may involve computing devices, servers, receivers, transmitters, processors, memory(ies), displays, networks particularly configured to implement various acts. The embodiments described herein are directed to electronic machines adapted for processing and transforming electromagnetic signals which represent various types of information. The embodiments described herein pervasively and integrally relate to machines and their uses; the embodiments described herein have no meaning or practical applicability outside their use with computer hardware, machines, a various hardware components.

Substituting the computing devices, servers, receivers, transmitters, processors, memory, display, networks particularly configured to implement various acts for non-physical hardware, using mental steps for example, may substantially affect the way the embodiments work.

Such hardware limitations are clearly essential elements of the embodiments described herein, and they cannot be omitted or substituted for mental means without having a material effect on the operation and structure of the embodiments described herein. The hardware is essential to the embodiments described herein and is not merely used to perform steps expeditiously and in an efficient manner.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of auto-tuning and compiling source code, the method comprising:
   receiving, by a computing device, the source code;
   generating, by the computing device, a first executable file by compiling the source code in accordance with a first optimization scheme;
   generating, by the computing device, a compiling report including data relating to the first optimization scheme, the data in the compiling report including transformation information identifying one or more transformations performed on the source code by a compiler and parameter information identifying one or more performance parameters associated with the one or more transformations;
   generating, by the computing device, a performance report including dynamic data relating to execution performance of the first executable file;
   receiving, by the computing device, performance bottleneck information indicative of one or more performance bottlenecks associated with the execution performance of the first executable file, the performance bottleneck information outputted by a machine learning unit by inputting the compiling report and the performance report into the machine learning unit;
   generating, by the computing device, a second optimization scheme based on at least the compiling report including the transformation information and the parameter information, the performance report, and the performance bottleneck information, the second optimization scheme outputted by the machine learning unit by inputting the compiling report, and the performance report, the performance bottleneck information into the machine learning unit:
   generating, by the computing device, a second executable file by compiling the source code in accordance with the second optimization scheme; and
   outputting, by the computing device, an optimized executable file based on the first executable file and the second executable file, wherein the generating the compiling report, the generating the performance report, the receiving the performance bottleneck information, the generating the second optimization scheme, and the generating the second executable file are performed iteratively until a performance target below a threshold value is achieved.

2. The method of claim 1, further comprising:
   prior to generating the first executable file, identifying the one or more performance parameters associated with the source code.

3. The method of claim 2, wherein a value of at least one performance parameter in the second optimization scheme is different from a value of at least one performance parameter in the first optimization scheme.

4. The method of claim 1, wherein the outputting the optimized executable file comprises determining whether dynamic data relating to the execution performance of the second executable file is superior to the dynamic data relating to the execution performance of the first executable file with respect to a performance metric.

5. The method of claim 1, wherein the data in the compiling report includes:
for each of the one or more transformations performed by the compiler, a corresponding location in the source code in which the each of the one or more transformations was performed.

6. The method of claim 1, wherein the dynamic data relating to the execution performance of the first executable file comprises one or more of dynamic data relating to simulated execution performance of the first executable file on a particular processor simulator and the dynamic data relating to the execution performance of the first executable file on the particular processor simulator.

7. The method of claim 1, wherein the dynamic data includes one or more of trace information comprising one or more of machine cycles, stalls, cache misses, branch prediction misses, memory trace data, register counts, pipeline stalls, memory access counts, performance counters, cycle accuracy data, and memory register information.

8. The method of claim 1, further comprising transmitting, to a data store, one or more of the source code, the compiling report, the first executable file, the second executable file, and the dynamic data.

9. The method of claim 1, further comprising:
generating, using tag machine learning unit, a mapping function for outputting an optimization recommendation based on previous dynamic data associated with at least one previously executed executable file, previous compiling reports from the at least one previously executed executable file, the performance report, and the compiling report.

10. The method of claim 1, wherein the generating the second optimization scheme comprises:
generating a search space containing a plurality of optimization schemes; and
determining the second optimization scheme based on executing a search strategy on the search space.

11. The method of claim 1, the data in the compiling report further including order information indicating an order in which the one or more transformations are performed on the source code by the compiler and phase information indicating optimization phases, the data in the compiling report further including type information indicating types of the dynamic data to be gathered during execution of the first executable file.

12. The method of claim 1, wherein the machine learning unit outputs the performance bottleneck information and the second optimization scheme using a knowledge database storing training data of previous compiling reports and previous performance reports of previously executed executable files based on similarity between structure of the source code and structures of the training data, the method further comprising:
storing the compiling report and the performance report in the training data of the knowledge database.

13. A computing system comprising:
at least one processor;
a memory having stored thereon computer-executable instructions that, when executed by the at least one processor, cause the at least one processor to perform operations of auto-tuning and compiling source code, the operations comprising:
responsive to receiving a source code, generating a first executable file by compiling the source code in accordance with a first optimization scheme;
generating a compiling report including data relating to the first optimization scheme, the data in the compiling report including transformation information identifying one or more transformations performed on the source code by a compiler and parameter information identifying one or more performance parameters associated with the one or more transformations;
generating a performance report including dynamic data relating to execution performance of the first executable file;
receiving performance bottleneck information indicative of one or more performance bottlenecks associated with the execution performance of the first executable file, the performance bottleneck information outputted by a machine learning unit by inputting the compiling report and the performance report into the machine learning unit;
generating a second optimization scheme based on at least the compiling report including the transformation information and the parameter information, the performance report, and the performance bottleneck information, the second optimization scheme outputted by the machine learning unit by inputting the compiling report, the performance report, and the performance bottleneck information into the machine learning unit;
generating a second executable file by compiling the source code in accordance with the second optimization scheme; and
outputting an optimized executable file based on the first executable file and the second executable file, wherein the generating the compiling report, the generating the performance report, the receiving the performance bottleneck information, the generating the second optimization scheme, and the generating the second executable file are performed iteratively until a performance target below a threshold value is achieved.

14. The computing system of claim 13, the operations further comprising:
prior to generating the first executable file, identifying the one or more performance parameters associated with the source code.

15. The computing system of claim 14, wherein a value of at least one performance parameter in the second optimization scheme is different from a value of at least one performance parameter in the first optimization scheme.

16. The computing system of claim 13, wherein the generating the second optimization scheme comprises determining, by a mapping function, the second optimization scheme based on at least one of the compiling report and the performance report.

17. The computing system of claim 16, wherein the outputting the optimized executable file comprises determining whether dynamic data relating to the execution performance of the second executable file is superior to the dynamic data relating to the execution performance of the first executable file with respect to a performance metric.

18. The computing system of claim 13, wherein the data in the compiling report includes:
for each of the one or more transformations performed by the compiler, a corresponding location in the source code in which the each of the one or more transformations was performed.

19. The computing system of claim 13, wherein the dynamic data relating to the execution performance of the first executable file comprises one or more of dynamic data relating to simulated execution performance of the first executable file on a particular processor simulator and the dynamic data relating to the execution performance of the first executable file on the particular processor simulator.

20. The computing system of claim 13, wherein the dynamic data includes one or more of trace information comprising one or more of machine cycles, stalls, cache misses, branch prediction misses, memory trace data, register counts, pipeline stalls, memory access counts, performance counters, cycle accuracy data, and memory register information.

21. The computing system of claim 13, the operations further comprising:
transmitting, to a data store, one or more of the source code, the compiling report, the first executable file, the second executable file, and the dynamic data.

22. The computing system of claim 13, the operations further comprising:
generating, using the machine learning unit, a mapping function for outputting an optimization recommendation based on previous dynamic data associated with at least one previously executed executable file, previous compiling reports from the at least one previously executed executable file, the performance report, and the compiling report.

23. The computing system of claim 13, wherein the generating the second optimization scheme comprises:
generating a search space containing a plurality of optimization schemes; and
determining the second optimization scheme based on executing a search strategy on the search space.

24. A non-transitory computer-readable storage medium storing instructions which, when executed by at least one processor of a computer, cause the at least one processor to perform operations of auto-tuning and compiling source code, the operations comprising:
responsive to receiving the source code of an auto-tuning enabled software program, generating a first executable file by compiling the source code in accordance with a first optimization scheme;
generating a compiling report including data relating to the first optimization scheme, the data in the compiling report including transformation information identifying one or more transformations performed on the source code by a compiler and parameter information identifying one or more performance parameters associated with the one or more transformations;
generating a performance report including dynamic data relating to execution performance of the first executable file;
receiving performance bottleneck information indicative of one or more performance bottlenecks associated with the execution performance of the first executable file, the performance bottleneck information outputted by a machine learning unit by inputting the compiling report and the performance report into the machine learning unit;
generating a second optimization scheme based on at least the compiling report including the transformation information and the parameter information, the performance report, and the performance bottleneck information, the second optimization scheme outputted by the machine learning unit by inputting the compiling report, the performance report, and the performance bottleneck information into the machine learning unit;
generating a second executable file by compiling the source code in accordance with the second optimization scheme; and
outputting an optimized executable file based on the first executable file and the second executable file, wherein the generating the performance report, the receiving the performance bottleneck information, the generating the second optimization scheme, and the generating the second executable file are performed iteratively until a performance target below a threshold value is achieved.

25. The non-transitory computer-readable storage medium of claim 24, the operations further comprising:
prior to generating the first executable file, identifying the one or more performance parameters associated with the source code.

26. The non-transitory computer-readable storage medium of claim 25, wherein a value of at least one performance parameter in the second optimization scheme is different from a value of at least one performance parameter in the first optimization scheme.

27. The non-transitory computer-readable storage medium of claim 24, wherein the generating the second optimization scheme comprises determining, by a mapping function, the second optimization scheme based on at least one of the compiling report and the performance report.

28. The non-transitory computer-readable storage medium of claim 27, wherein the outputting the optimized executable file comprises determining whether dynamic data relating to the execution performance of the second executable file is superior to the dynamic data relating to the execution performance of the first executable file with respect to a performance metric.

29. The non-transitory computer-readable storage medium of claim 24, wherein the data in the compiling report includes:
for each of the one or more transformations performed by the compiler, a corresponding location in the source code in which the each of the one or more transformations was performed.

30. The non-transitory computer-readable storage medium of claim 24, wherein the dynamic data relating to the execution performance of the first executable file comprises one or more of dynamic data relating to simulated execution performance of the first executable file on a particular processor simulator and the dynamic data relating to the execution performance of the first executable file on the particular processor simulator.

31. The non-transitory computer-readable storage medium of claim 24, wherein the dynamic data includes one or more of trace information comprising one or more of machine cycles, stalls, cache misses, branch prediction misses, memory trace data, register counts, pipeline stalls, memory access counts, performance counters, cycle accuracy data, and memory register information.

32. The non-transitory computer-readable storage medium of claim 24, the operations further comprising:
transmitting, to a data store, one or more of the source code, the compiling report, the first executable file, the second executable file, and the dynamic data.

33. The non-transitory computer-readable storage medium of claim 24, the operations further comprising:
generating, using the machine learning unit, a mapping function for outputting an optimization recommendation based on previous dynamic data associated with at least one previously executed executable file, previous compiling reports from the at least one previously executed executable file, the performance report, and the compiling report.

34. The non-transitory computer-readable storage medium of claim 24, wherein the generating the second optimization scheme comprises:
  generating a search space containing a plurality of optimization schemes; and
  determining the second optimization scheme based on executing a search strategy on the search space.

* * * * *

UNITED STATES PATENT AND TRADEMARK OFFICE
CERTIFICATE OF CORRECTION

PATENT NO.        : 11,221,834 B2
APPLICATION NO.   : 16/827123
DATED             : January 11, 2022
INVENTOR(S)       : Yaoqing Gao Page 1 of 1

It is certified that error appears in the above-identified patent and that said Letters Patent is hereby corrected as shown below:

In the Claims

Claim 9, Column 25, Line 25 delete "using tag machine" and insert --using the machine--.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*